March 21, 1933.　　A. A. THEODOROPULOS　　1,902,678
TWIN FOOD MIXER
Filed April 18, 1932
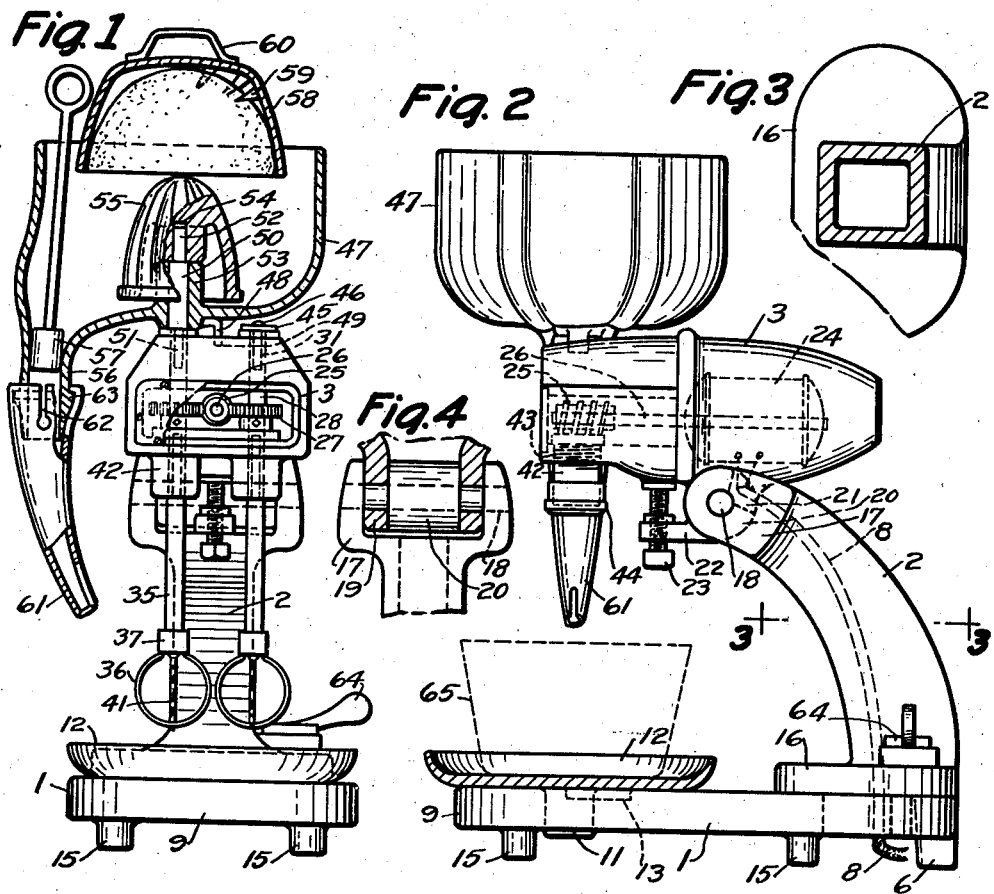
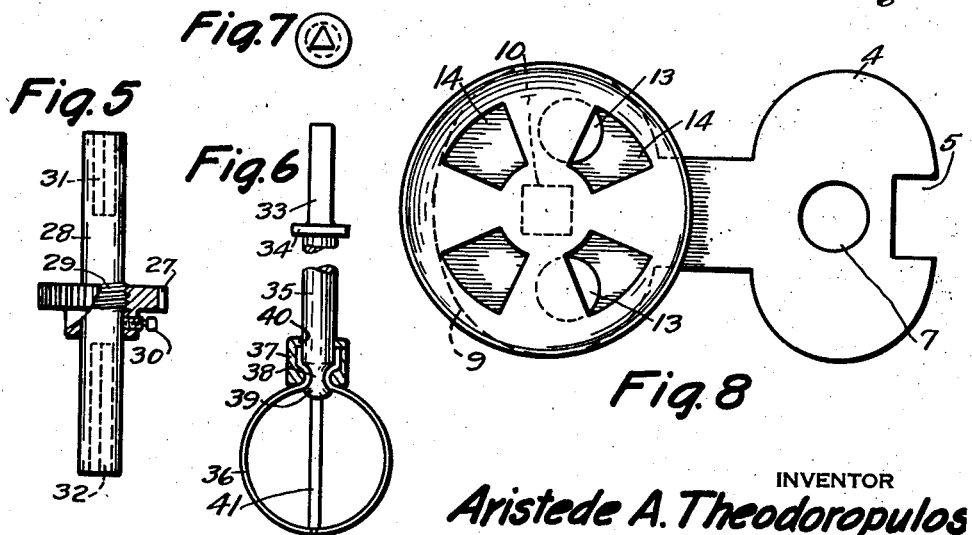
INVENTOR
Aristede A. Theodoropulos
BY
Harry Bowen
ATTORNEY Patented Mar. 21, 1933

1,902,678

UNITED STATES PATENT OFFICE

ARISTEDE A. THEODOROPULOS, OF NEW YORK, N. Y.

TWIN FOOD MIXER

Application filed April 18, 1932. Serial No. 605,860.

The invention is a mixer comprising a base with a motor adjustably supported on an arm above the base and adapted to operate spindles having mixing devices thereon.

The invention is an improvement over similar devices in that the operating spindles are solid so that the spur gears by which they are operated may be rigidly mounted and the mixing device may be rigidly held in sockets in the ends of the spindles by friction. Other improvements will be noted as the construction is described.

The object of the invention is to provide a mixing device that is comparatively solid and that will last indefinitely without repairing.

Another object of the invention is to provide a mechanical mixer in which the mixing device may readily be removed and replaced.
Another object of the invention is to provide a mechanical mixer having mixing devices in which the mixing devices are held in sockets having straight sides and are not held by set-screws, or the like.
Another object of the invention is to provide a mixing device in which the parts may readily be taken apart and also assembled.

Another object of the invention is to provide a mixing device in which the spindles are solid so that spur gears may be used in combination with a worm for driving.

A further object of the invention is to provide a mixing device in which the mixing attachments may be inserted in either the upper or lower part of the mixer head.

And a still further object of the invention is to provide a mechanical mixer that is adapted for mixing eggs, whipping cream, squeezing oranges, and other similar purposes which is of a comparatively simple and economical construction.

With these ends in view the invention embodies a mixer having a base, a motor housing adjustably supported in a stand above the said base, two spindles rotatably mounted in said motor housing and adapted to be rotated by said motor, mixing devices adapted to be inserted in sockets in the ends of said spindles, and suitable mixing bowls and appliances adapted to be attached to said mixer.

Other features and advantages of the invention will appear from the following description taken in connection with the drawing, wherein:—

Figure 1 is a front elevation of the mixer with part broken away.

Figure 2 is a side elevation of the mixer.

Figure 3 is a cross section on line 3—3 of Figure 2 showing the mixer stand.

Figure 4 is a detail showing the hub thru which the motor housing is mounted upon the stand.

Figure 5 is a detail of one of the spindles.

Figure 6 is a view showing a mixing device.

Figure 7 is a view showing the end of the spindle of the mixing device.

Figure 8 is a plan view of the base with the motor stand removed.

In the drawing the device is shown as it would be made wherein numeral 1 indicates the base, numeral 2 the motor stand, and numeral 3 the motor housing or head.

The base 1 may be made, as shown in Figures 3 and 8, with a flat plate having an enlarged section 4 at the rear upon which the stand 2 rests and a socket 5 into which a projection 6 on the stand 2 extends, so that it forms a leg, as shown in Figure 2. An opening 7 is also provided in the section 4 thru which wires 8 may be placed which will extend upward thru the stand 2 to the motor, and may be connected to any suitable source of electric current. At the opposite end of the base is another enlarged section 9 having a square opening 10 therein to receive a square stem 11 of a plate 12 that may be placed upon the base. This section is also provided with openings 13 stamped in the upper surface as shown, and the plate may be provided with openings 14, as shown in Figure 8. The base may also be provided with legs 15 which may be of any suitable shape and located in any suitable points.

The stand 2 is made of a rectangular shape, as shown in Figure 3, and it is provided at the lower end with a base plate 16 that rests upon the base 1, and at the upper end is a yoke with ears 17 at the sides between which the head 3 is pivotally mounted on a pin 18. At the lower side of the head 3 are extensions

19, as shown in Figure 4, and between these extensions is a collar 20 having an opening 21 therein, as shown in Figure 2, thru which the wires 8 may pass to the motor in the head 3. The stand 2 may also have a projection 22 at the front in which is a set-screw 23 that engages the lower side of the head so that the head rests upon the set-screw and the position thereof may be adjusted by turning the set-screw upward or downward.

In the head 3 is a motor 24 which drives a worm 25 thru a shaft 26 and it will be noted that the worm 25 meshes with spur gears 27 on vertical spindles 28. The gears 27 are screwed on the spindles 28 upon the threads 29 and may also be held by the set-screws 30 so that the gears are doubly held by the screw threads and also by the set-screws thereby insuring a positive mounting. In the upper ends of the spindles are triangular shaped sockets 31 and in the lower ends are similarly shaped sockets 32, as shown. An attachment that may be used in the mixer is shown in Figure 6 and this is provided with a triangular shaped end 33 that fits snugly in the socket 32 so that as it is pressed into place it will hold the attachment. A collar 34 may be placed upon the attachment shown in Figure 6, which is indicated by the numeral 35, and at the lower end of the attachment 35 is a ring 36 which is mounted by holding the ends thereof between the walls of the attachment 35 and a sleeve 37. The attachment is provided with a recess 38 and the upper ends of the ring 36 may be forced and held into the recess by a ridge 39 on the sleeve 37, and at the upper end of the sleeve is another ridge 40 as shown. At the lower end of the attachment 35 is a pin 41 which extends to the lower end of the member 36 and may be pivotally mounted therein, as shown. Hubs 42, which are square to correspond with the shape or outline of the head, are provided at the lower side of the head 3 which form bearings for the lower ends of the spindles 28. These hubs may be made integral with the head, as shown in the Figure 1, or may be screwed into the head, as shown at the point 43 in Figure 2. These hubs may also have caps 44 which will fit over the lower ends, as shown in Figure 2, if desired. Plates 45 may be pivotally attached to the top of the housing by pins 46 and positioned so that they may slide over the upper ends of the spindles 28 when the attachments at the top of the head are not in use.

In the design shown in Figure 1 a bowl 47 is shown positioned on top of the head and this is provided with a locating finger 48 that fits into a notch 49 in the head to locate and hold the bowl in place. Another spindle 50 may be provided which has triangular shaped ends 51 and 52 and this may be mounted in a hub 53 in the bowl 47 with the lower end extending into the socket 31 in the upper end of one of the spindles 28 and the upper end extending into a socket 54 in a corrugated end 55 which may be used for squeezing member oranges, or the like. It will be noted that the orange may be cut in half and one-half held over the member 55 while the member is rotating and as the orange is forced downward the juice will be removed and will drop into the bowl 47. The bowl 47 may be provided with a neck 56 and a rubber stopper 57 may be placed into the neck to hold the juice in the bowl until it is desired to permit it to drain therefrom. A cup shaped member 58 may be provided to hold the orange, as shown, and this may have inwardly extending points 59 punched from the walls thereof to hold the orange in place, and also a handle 60 by which it may be held by hand.

A spout 61 may be provided which has slits 62 in the upper end that permit it to slide over a ridge 63 at the lower end of the neck 56 so that it may readily be pressed into place and then turned to any position desired.

The device may be operated by a switch 64 which may be located upon the base of the stand 2, as shown in Figures 1 and 2, however, it will be understood that any other means may be used for starting and stopping the motor.

It will be understood that other changes may be made in the construction without departing from the spirit of the invention. One of which changes may be in the shape or design of any of the parts, another may be in the use of other means for operating the spindles by the motor, another may be in the use of any other attachments or containers in combination with the device, and still another may be in the use of any other means for connecting the attachments to the motor or driving elements.

The construction will be readily understood from the foregoing description. In use the device may be provided as shown and it will be noted that a bowl or other container, as indicated by the numeral 65, may be placed upon the plate 12 and with the attachments 35 in place, as shown in Figure 1, any product in the bowl may readily be thoroughly mixed. It will be noted that only one of the attachments 35 may be used instead of two and also that any other attachment may be used in the spindle.

The plate 12 is provided with a square stem 11, and this is held in the four-cornered hole 10 so that it will not rotate, and will therefore hold a bowl, or the like, stationary while a substance or product therein is being mixed, thereby eliminating the necessity of holding the bowl by hand.

Having thus fully described the invention what I claim as new and desire to secure by Letters Patent, is:

1. In a mixing machine of the character described, a head, a motor in said head, a worm gear operated by said motor, spur gears meshing with said worm gear, spindles with solid central portions having triangular shaped sockets in their ends upon which said spur gears are mounted, threads holding said spur gears on said spindles, set screws also holding said spur gears on said spindles, a stand pivotally supporting said head, and a base in which said stand is freely mounted.

2. In a mixing machine of the character described, a head, a motor in said head, a worm gear operated by said motor, spur gears meshing with said worm gear, spindles with solid central portions having triangular shaped sockets in their ends upon which said spur gears are mounted, said spur gears screwed upon said spindles, set screws locking the spur gears on said spindles, mixing attachments having triangular shaped ends adapted to be held in said spindle sockets by friction, a stand adjustably supporting said head, and a base in which said stand is freely mounted.

3. In a mixing machine of the character described, a head, a motor in said head, a pinion operated by said motor, gears meshing with said pinion, spindles upon which said gears are mounted, said spindles having solid central portions with triangular shaped sockets in their upper and lower ends, threads holding said gears on said spindles, means locking said gears on said threads, mixing attachments having triangular shaped ends adapted to be held in said spindle sockets by friction, a stand adjustably supporting said head, and a base in which said stand is freely mounted.

4. In a mixing machine of the character described, a head, a motor in said head, a pinion operated by said motor, gears meshing with said pinion, spindles upon which said gears are mounted, said spindles having solid central portions with triangular shaped sockets in their upper and lower ends, threads holding said gears on said spindles, means locking said gears on said threads, mixing attachments having triangular shaped ends adapted to be held in said spindle sockets by friction, and a stand adjustably supporting said head.

5. In a mixing machine of the character described, a head, a motor in said head, a pinion operated by said motor, gears meshing with said pinion, spindles upon which said gears are mounted, said spindles having solid central portions with triangular shaped sockets in their upper and lower ends, threads holding said gears on said spindles, means locking said gears on said threads, mixing attachments having triangular shaped ends adapted to be held in said spindle sockets by friction, said attachments adapted to be positioned above and below said head, a stand adjustably supporting said head, and a base in which said stand is freely mounted.

6. In a mixing machine of the character described, a head, a motor in said head, a pinion operated by said motor, gears meshing with said pinion, spindles upon which said gears are mounted, said spindles having solid central portions with triangular shaped sockets in their upper and lower ends, threads holding said gears on said spindles, means locking said gears on said threads, mixing attachments having triangular shaped ends adapted to be held in said spindle sockets by friction, said attachments adapted to be positioned above and below said head, a stand adjustably supporting said head, a base in which said stand is freely mounted, and means enclosing the attachments positioned above said head.

7. In a mixing machine of the character described, a head, a motor in said head, a pinion operated by said motor, gears meshing with said pinion, spindles upon which said gears are mounted, said spindles having solid central portions with triangular shaped sockets in their upper and lower ends, threads holding said gears on said spindles, means locking said gears on said threads, mixing attachments having triangular shaped ends adapted to be held in said spindle sockets by friction, an auxiliary spindle having triangular shaped ends adapted to be placed in the socket at the upper end of one of the spindles to form an extension therefor, attachments adapted to be placed at the upper end of said auxiliary spindle, a housing adapted to be placed on top of said head to enclose the attachments on said auxiliary spindle, a stand adjustably supporting said head, and a base in which said stand is freely mounted.

8. In a mixing machine of the character described, a head, a motor in said head, a pinion operated by said motor, gears meshing with said pinion, spindles upon which said gears are mounted, said spindles having solid central portions with triangular shaped sockets in their ends, threads holding said gears on said spindles, set screws also holding said gears on said spindles, said head having a compartment in which said gears and pinion are positioned, a removable cover for said compartment providing access to said gears and pinion, a stand pivotally supporting said head, and a base in which said stand is freely mounted.

9. In a mixing machine of the character described, a head, a motor in said head, a pinion operated by said motor, gears meshing with said pinion, spindles upon which said gears are mounted, said spindles having solid central portions with triangular shaped sockets in their ends, threads holding said gears on said spindles, set screws also holding said gears on said spindles, said head having a compartment in which said gears and pinion are positioned, a removable cover for said compartment providing access to said gears and pinion, a stand pivotally supporting said head, adjustable means on said stand holding said head in position, and a base in which said stand is freely mounted.

In testimony whereof I affix my signature.

ARISTEDE A. THEODOROPULOS.